United States Patent
Sundberg et al.

(12) United States Patent
(10) Patent No.: US 6,903,313 B2
(45) Date of Patent: Jun. 7, 2005

(54) RESISTANCE HEATING ELEMENT FOR EXTREME TEMPERATURES

(75) Inventors: Mats Sundberg, Västerås (SE); Chet Popilowski, Washington, CT (US)

(73) Assignee: Sandvik AB, Sandviken (SE)

( * ) Notice: Subject to any disclaimer, the term of this patent is extended or adjusted under 35 U.S.C. 154(b) by 9 days.

(21) Appl. No.: 10/451,035

(22) PCT Filed: Dec. 14, 2001

(86) PCT No.: PCT/SE01/02784

§ 371 (c)(1),
(2), (4) Date: Nov. 24, 2003

(87) PCT Pub. No.: WO02/51208

PCT Pub. Date: Jun. 27, 2002

(65) Prior Publication Data

US 2004/0218450 A1 Nov. 4, 2004

(30) Foreign Application Priority Data

Dec. 21, 2000 (SE) .......................................... 00048199

(51) Int. Cl.⁷ .......................... H05B 3/10; C04B 35/56
(52) U.S. Cl. .......................... 219/553; 501/87; 501/88; 501/91

(58) Field of Search .............................. 219/553; 501/87, 501/88, 89, 90, 91, 92

(56) References Cited

U.S. PATENT DOCUMENTS

| 5,942,455 A | * | 8/1999 | Barsoum et al. ............... 501/91 |
| 6,312,570 B1 | * | 11/2001 | Mroz, Jr. ................. 204/247.3 |
| 6,461,989 B1 | * | 10/2002 | El-Raghy et al. ............. 501/87 |
| 2002/0068488 A1 | * | 6/2002 | Tuller et al. ................ 439/775 |

FOREIGN PATENT DOCUMENTS

| DK | 173415 B1 | 10/2000 |
| JP | 63-274665 | * 11/1988 |
| SE | 124 534 | 4/1949 |
| SE | 504 235 C2 | 12/1996 |

\* cited by examiner

*Primary Examiner*—Karl Group
(74) *Attorney, Agent, or Firm*—Alfred J. Mangels

(57) ABSTRACT

An electrical resistance heating element operable at extremely high temperature, up 2300° C. when used in a vacuum or in a reducing atmosphere, and up to bout 1200° C. when used in an oxidizing atmosphere. The element is formed substantially from titanium silicon carbide ($Ti_3SiC_2$), which is readily workable to enable it to be produced in different forms. It also has a higher mechanical strength than that of graphite heating elements.

4 Claims, No Drawings

RESISTANCE HEATING ELEMENT FOR EXTREME TEMPERATURES

BACKGROUND OF THE INVENTION

1. Field of the Invention

The present invention relates to a novel electrical resistance heating element for extremely high temperatures.

The heating element is intended for use in connection with heat treatment and sintering in inert and reducing atmospheres, in oxidizing atmospheres, and in a vacuum environment, up to extremely high temperatures, such as 2300° C.

2. Description of the Related Art

Resistance heating elements of the present type are manufactured by Applicant (Sandvik A B, of Sandviken, Sweden), such as resistance elements based on NiCr, FeCrAl, SiC, and $MoSi_2$. These materials are used in a plurality of atmospheres and at mutually different temperatures. A common feature of these materials is that their usefulness at high temperatures, i.e., temperatures above 1300° C., is limited in reducing environments and under vacuum conditions.

Heating elements comprised primarily of Mo, W, Ta (tantalum),. and graphite are used for temperatures up to above 2000° C. Each of these materials has drawbacks and limitations, a common feature being that said materials oxidize readily when subjected to temperatures above 400–500° C., thereby requiring particular attention to be paid to furnace design and furnace operation. The high specific weight of Ta, Mo, and W also necessitates limitations with respect to mechanical construction. Further, material costs for refractory metals are high in themselves.

SUMMARY OF THE INVENTION

The present invention relates to resistance heating elements comprised of a novel material.

The present invention thus relates to an electrical resistance element for heating purposes, which element is comprised substantially of titanium silicon carbide ($Ti_3SiC_2$).

According to the invention, the resistance element is substantially comprised of titanium silicon carbide ($Ti_3SiC_2$).

The element may consist of almost 100 weight percent $Ti_3SiC_2$.

DESCRIPTION OF THE PREFERRED EMBODIMENTS

According to a preferred embodiment, said resistance element consists at least of 85 weight % titanium silicon carbide.

According to a preferred embodiment, the material contains up to 15 weight % of one or more of the compounds TiC, $TiSi_2$, $Ti_5Si_3$, or SiC, and thus at least 85 weight % titanium silicon carbide., In its pure form, titanium silicon carbide is a relatively new ceramic material that possesses very good mechanical and thermal properties, among other things.

In texture, the material is of a so-called nanolaminate type, which contributes to very high impact durability and high thermal shock resistance. The material can be readily worked and, for instance, can be cut with a saw, which is unique in respect of ceramic material.

The material is relatively light, having a density of 4.5 $g/cm^3$. The thermal conductivity is relatively constant at about 35 W/mK and the material is also a good conductor of electricity.

The material can be deformed plastically at high temperatures. The shrink properties of the material exceed those of so-called superalloys that are used up to temperatures of 1100° C., this temperature by no means constituting an upper temperature limit for $Ti_3SiC_2$.

One highly significant property is that the oxidation properties of $Ti_3SiC_2$ surpass the oxidation properties of Mo, W, Ta (tantalum), and graphite.

The material $Ti_3SiC_2$ exists up to a temperature of 2330° C. It breaks down into $TiC_x$ and Si at this temperature, thus placing in practice a temperature limit of 2300° C. when using said material.

The properties of a phase pure material of $Ti_3SiC_2$ were relatively unknown until recently, due to the difficulty of producing such a material.

Measurements carried out on the electrical resistance of densely sintered wire, produced from $Ti_3SiC_2$ powder in an argon atmosphere at temperatures ranging from 20–1600° C., showed that the resistance of the material within this range varied linearly from about 0.28 ohm\*$mm^2$/m to about 1.43 ohm\*$mm^2$/m. This lies on the level of $MoSi_2$ heating elements at room temperature, but is about 55% lower than the level for $MoSi_2$ heating elements at 1600° C. It has been found that the stability of the material is favored by decreasing partial pressures of oxygen, which shows that the material can be used successfully in vacuum furnaces under high vacuum, in which low degassing rates from the heating elements is essential.

It has also been found, surprisingly, that the material remains unaffected when exposed to dry hydrogen gas up to a temperature of at least 1800° C. This temperature is the maximum temperature at which the test was carried out, although it is likely that the material will remain stable in dry hydrogen gas up to still higher temperatures.

Titanium silicon carbide has also been found to have very good properties in oxidizing atmospheres, such as air, up to temperatures of 1100–1200° C. In this case, the surface oxide of the element is comprised of $TiO_2$. Oxides in the form of $SiO_2$—$TiO_2$ are present inwardly of the surface oxide. However, the properties of the titanium silicon carbide in oxidizing atmospheres are surpassed at these temperatures and higher temperatures by alloys of the type FeCrAl and $MoSi_2$. These materials are produced by applicant in a number of forms, retailed under the trademarks KANTHAL and KANTHAL SUPER. $Ti_3SiC_2$ does not therefore provide a better alternative to these alloys in an oxidizing environment.

Titanium silicon carbide is also resistant over relatively long periods of time during oxidation up to 1700° C. in air, in comparison with elements comprised of Mo, W, Ta (tantalum), and graphite. This property means that the material will not be consumed over a short time period, should it not be possible to maintain an inert or reducing atmosphere in the furnace for some reason or another.

By way of summary, it can be said that the inventive resistor element is particularly suited for use in a vacuum or in an inert or a reducing atmosphere up to a temperature of 2300° C., and in oxidizing atmospheres up to a temperature of about 1200° C.

Furnaces equipped with $Ti_3SiC_2$ heating elements need not necessarily have a gas-tight enclosure that protects against oxidation, since the material is considerably more resistant to oxidation than Ta, Mo, W, and graphite. This facilitates furnace construction.

The mechanical strength of $Ti_3SiC_2$ is much greater than graphite heating elements, which are also used in a vacuum environment and in an inert and reducing atmosphere.

Another significant advantage with $Ti_3SiC_2$ is that relatively thin heating elements can be produced. This enables the electrical resistance to be kept high, resulting in a not excessively low voltage across the element. The electrical resistance of $Ti_3SiC_2$ at room temperature is about six times higher than Mo and W, thereby reducing the cost of requisite control and regulating equipment.

Heating elements comprised of $Ti_3SiC_2$ can be made in many different forms, such as in the form of rods, tubes, crucibles (with or without electrode patterns), thin layers that include an electrode pattern (of the "electric oven plate" or surface heater type), slabs, bands. For example, elements can be produced in rod form and given a U-shape and provided with coarser connectors, in the same way as in the case of elements of the $MoSi_2$ - type. Thin layers provided with electrode patterns constitute an alternative to the conventional filament-type heating element design.

The good workability of $Ti_3SiC_2$ enables complicated geometries to be produced at low cost the aid of simple means.

In addition to its use in heating elements, $Ti_3SiC_2$ can also be used in furnaces for different purposes, such as product-carrying material, heat shields, furnace rollers and furnace beams, mufflers, hangers, belts and chains, lead-throughs, and also as furnace linings.

What is claimed is:

1. An electrical resistance heating element for heating purposes, comprising a material that is substantially $Ti_3SiC_2$.

2. An electrical resistance heating element according to claim 1, wherein said material includes at least 85 weight % $Ti_3SiC_2$.

3. An electrical resistance heating element according to claim 1, in which the material includes up to 15 weight % of a compound selected from the group consisting of TiC, $TiSi_2$, $Ti_5Si_3$, and SiC.

4. An electrical resistance heating element for heating purposes consisting essentially of $Ti_3SiC_2$.

* * * * *